United States Patent
Kahlon et al.

(10) Patent No.: US 8,185,875 B2
(45) Date of Patent: May 22, 2012

(54) FAST AND ACCURATE STATIC DATA-RACE DETECTION FOR CONCURRENT PROGRAMS

(75) Inventors: Vineet Kahlon, Princeton, NJ (US); Yu Yang, Salt Lake City, UT (US); Sriram Sankaranarayanan, Plainsboro, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1195 days.

(21) Appl. No.: 11/954,869

(22) Filed: Dec. 12, 2007

(65) Prior Publication Data

US 2008/0178156 A1 Jul. 24, 2008

Related U.S. Application Data

(60) Provisional application No. 60/886,304, filed on Jan. 24, 2007.

(51) Int. Cl.
G06F 9/44 (2006.01)
(52) U.S. Cl. ..................................... 717/126
(58) Field of Classification Search ............... 717/126
See application file for complete search history.

(56) References Cited

U.S. PATENT DOCUMENTS

| | | | | |
|---|---|---|---|---|
| 6,343,371 B1 * | 1/2002 | Flanagan et al. | | 717/124 |
| 7,398,516 B2 * | 7/2008 | Berg et al. | | 717/126 |
| 7,469,403 B2 * | 12/2008 | Choi et al. | | 717/127 |
| 7,516,446 B2 * | 4/2009 | Choi et al. | | 717/128 |
| 7,650,595 B2 * | 1/2010 | Qadeer et al. | | 717/127 |
| 7,673,181 B1 * | 3/2010 | Lindo et al. | | 714/38.13 |
| 7,685,572 B1 * | 3/2010 | Qiao | | 717/126 |
| 7,844,862 B1 * | 11/2010 | Grove et al. | | 714/47.1 |
| 7,861,118 B2 * | 12/2010 | Edwards et al. | | 714/38.1 |
| 2002/0188651 A1 * | 12/2002 | Choi et al. | | 709/107 |
| 2003/0131283 A1 * | 7/2003 | Ur et al. | | 714/36 |
| 2003/0236951 A1 * | 12/2003 | Choi et al. | | 711/150 |

OTHER PUBLICATIONS

Emami, et al., Context-Sensitive Interprocedural Points-to Analysis in the presence of Function Pointers, ACM (1994).*
Choi, et al., Static Datarace Analysis for Multithreaded Object-Oriented Programs, IBM (Aug. 9, 2001).*

(Continued)

Primary Examiner — Wei Zhen
Assistant Examiner — Kevin Dothager
(74) Attorney, Agent, or Firm — James Bitetto; Joseph Kolodka

(57) ABSTRACT

A system and method for race warning generation for computer program verification includes determining shared variables and determining context-sensitive points-to sets for lock pointers by focusing on pointers that may affect aliases of lock pointers, and by leveraging function summarization. Locksets are determined at locations where shared variables are accessed using the points-to sets for lock pointers. Warnings are based on disjointness of locksets.

25 Claims, 6 Drawing Sheets

OTHER PUBLICATIONS

Choi J, K. Lee, A. Loginov, R.O'Callahan, V. Sarkar, and M. Sridharan. Efficient and Precise Datarace Detection for Multithreaded Object-oriented Programs. In PLDI, Berlin, Germany; Jun. 17-19, 2002; 12 pages.

D. Engler and K. Ashcraft. RacerX: Effective, Static Detection of Race Conditions and Deadlocks. In SOSP , 2003; 16 pages.

D. Naik and A. Aiken. Conditional Must Not Aliasing for Static Race Detection. In POPL'07; Nice, France; Jan. 17-19, 2007; pp. 327-338.

P. Pratikakis, J. S. Foster, and M. Hicks. Locksmith: Context-Sensitive Correlation Analysis for Race Detection. In PLDI '06; Ottawa, Ontario, Canada; Jun. 10-16, 2006; pp. 320-331.

S. Savage, M. Burrows, G. Nelson, P. Sobalvarro, and T. Anderson. Eraser: A Dynamic Data Race Detector for Multithreaded Programming. In ACM TCS, vol. 15(4); Nov. 1997; pp. 391-411.

B. Steensgaard. Points-to Analysis in Almost Linear Time. In POPL '96; St. Petersburgh, FL; 1996; pp. 32-41.

\* cited by examiner

Dataflow Analysis for Shared Variable Detection

1: Initialize $V_{sh} = \emptyset$, $G$ to the set of global variables of thread $T$, $in$ to the entry statement of $T$, worklist $W$ to the set $\{(in, G)\}$, and the set of processed tuples $Pr$ to $\{(in, G)\}$.
2: repeat
3:     Remove a tuple $tup = (st, P_{sh})$ from $W$.
4:     if $st$ is of the form $v = w$ where $v$ and $w$ are program variables then
5:         if $w \in P_{sh}$ then
6:             set $P_{sh} = P_{sh} \cup \{v\}$
7:         else if $v \in P_{sh}$ then
8:             set $V_{sh} = V_{sh} \cup \{v\}$.
9:         end if
10:     else if $st$ is of the form $v = exp$ where $exp$ is an expression other than a simple variable then
11:         if $v \in P_{sh}$ then
12:             set $V_{sh} = V_{sh} \cup \{v\}$.
13:         end if
14:     end if
15:     for each successor statement $st'$ of $st$ do
16:         if there does not exist a tuple in $Pr$ of the form $(st', S)$, where $P_{sh} \subseteq S$, then
17:             add $(st', P_{sh})$ to both $W$ and $Pr$.
18:         end if
19:     end for
20: until $W$ is empty
21: return $V_{sh}$

```
foo(){                bar(){              goo(){
   1a: p = g₁;           1b: goo();          1c: p = g₃;
   2a: q = g₂;        }                      2c: q = g₄;
   3a: bar();                                3c: if(global_var)
   4a: ... ;                                 4c:   p = g₅;
}                                            5c: u = 1 ;
                                          }
```

FIG. 3

Summary Computation for Lock Pointer Analysis

1: Input: Lock Pointer: $p$, Control Location $l$, Function $f$.
2: Initialize $W$ to $(l, \{p\})$.
3: repeat
4:    Remove a ready tuple $tup = (m, A)$ from $W$. Set $A' = A$.
5:    if lock pointer $t \in A$ and the statement at location $m$ is of the form $t = r$ then
6:       $A' = (A \setminus \{t\}) \cup \{r\}$
7:    end if
8:    $NewTuples = \emptyset$
9:    if $m$ is the entry location of function $f$ then
10:       add $(p, A)$ to the summary
11:    else if $m$ is the call return site of a function call for $g$ then
12:       if the summary tuples have already been computed for all lock pointers in $A'$ for the exit location $exit_g$ of $g$ then
13:          $B = \bigcup_{t \in A'} Sum(g, exit_g, t)$, where $Sum(g, exit_g, t)$ is the summary of pointer $t$ with respect to $exit_g$ if $t$ is written to in $g$ else it is $t$
14:          Let $NewTuples = \{(m', B)\}$, where $m'$ is the call site of $g$ corresponding to $m$
15:       else
16:          Add $(exit_g, A')$ to $W$
17:       end if
18:    else
19:       $NewTuples = \bigcup_{m' \in Pred} \{(m', A')\}$, where $Pred$ is the set of predecessors of $m$
20:    end if
21:    for each tuple $(l, B) \in NewTuples$ that has not already been processed do
22:       if there exists a tuple of the form $(l, C)$ in $W$ then
23:          replace $(l, C)$ by $(l, C \cap B)$
24:       else
25:          Add $(l, B)$ to $W$
26:       end if
27:    end for
28: until $W$ is empty

FIG. 4

```
1a: a = 1;
2a: lock(lk1);
3a: lock(lk2);
4a: y = 1;
5a: unlock(lk2);
6a: x = 3;
7a: unlock(lk1);

T1
```

```
1b: lock(lk2)
2b: x = 0;
3b: lock(lk1);
4b: b = 2;
5b: unlock(lk1);
6b: x = 2;
7b: unlock(lk2);
8b: lock(lk2);
9b: x = 1;

FAST AND ACCURATE STATIC DATA-RACE DETECTION FOR CONCURRENT PROGRAMS

RELATED APPLICATION INFORMATION

This application claims priority to provisional application Ser. No. 60/886,304 filed on Jan. 24, 2007, incorporated herein by reference.

BACKGROUND

1. Technical Field

The present invention relates to computer system verification and more particularly to systems and methods for debugging multi-threaded software.

2. Description of the Related Art

The widespread use of concurrent software in modern day computing systems necessitates the development of effective debugging methodologies for multi-threaded software. Multi-threaded programs, however, are behaviorally complex involving subtle interactions between threads which makes them hard to analyze manually. This motivates the use of automated formal methods to reason about such systems. Particularly notorious to catch are errors arising out of data race violations.

A data race occurs when two different threads in a given program can simultaneously access a shared variable, with at least one of the accesses being a write operation. Checking for data races is often a critical first step in the debugging of concurrent programs. Indeed, the presence of data races in a program typically renders its behavior non-deterministic thereby making it difficult to reason about it for more complex and interesting properties.

The classical approach to data race detection involves three steps. The first and most critical step is the automatic discovery of shared variables, i.e., variables which can be accessed by two or more threads. Control locations where these shared variables are read or written determine potential locations for data races to arise. In fact, locking related data races arise if a common shared variable is accessed at simultaneously reachable program locations in two different threads where disjoint sets of locks are held. Since locks are typically accessed via pointers, in order to determine these locksets at program locations of interest, in the second step, a must-pointer alias analysis is carried out. Finally, the main drawback of static analysis is that a large number of bogus data race warnings can often be generated which do not correspond to true bugs. The last step, therefore, is to use warning reduction and ranking techniques in order to either filter out bogus warnings or use ranking to prioritize them based on the degree of confidence.

The challenge lies in carrying out race detection while satisfying the conflicting goals of scalability and accuracy both of which depend on various factors. Key among these factors are (i) accuracy of shared variable discovery, and (ii) accuracy and scalability of the alias analyses for determining shared variables (must aliases) and locksets (may aliases). Incorrectly labeling a variable as shared renders all warnings generated for it bogus. On the other hand, if reporting a variable as shared is missed then a failure to generate warnings for a genuine data race involving this variable results.

Considerable research has been devoted to automatic shared variable discovery. However, most existing techniques are based on the underlying assumption that when accessing shared variables concurrent programs almost always follow a locking discipline by associating with each shared v variable with a lock $l_v$, which needs to be acquired before any access to v.

Existing techniques focus on computing this association between locks and variables. Towards that end, various correlation based techniques have been developed—both statistical and constraint based. An advantage of statistical techniques is that they are scalable and do not depend on an alias analysis which can often be a bottleneck. However, the failure of correlation based techniques to detect the shared variable responsible for data races in, e.g., a suite of Linux drivers exposed the fact that their main weakness turns out to be this very reliance on the existence of a locking discipline.

Indeed, many data races arise precisely when the locking discipline is violated. Furthermore, it turns out that in most of the drivers that were considered, the original implementations correctly followed lock discipline. Data race bugs were introduced only when the programs were later modified by adding new code either for optimization purposes or in order to fix bugs. Typically, this newly added code was a "hack" that introduced lock-free accesses to shared variables that were not present in the original code. Since the only occurrences of these variables were in regions unguarded by locks, no meaningful correlations could be developed for them and was a key reason why correlation-based techniques did not work.

Race detection is a well studied problem and various techniques have been employed to attack the problem. 1) Run time data race detection: the key idea is to explore concrete executions of the given program is a systematic manner to guide one to the data race present in the code. However, since the state space of a typically concurrent program is large and, in principle, even infinite, it is hard to get good coverage and provide guarantees. 2) Model Checking: explores the entire state space of the given concurrent program. There is little hope of scaling this to handle large-scale real-life programs. 3) Static Analysis: Explores the control flow graph of a given program to extract lockset information. Advantages include scalability to large code bases. Disadvantages include too many bogus warnings.

SUMMARY

To ensure that no shared variable fails detection, we use a very liberal criterion to categorize variables as shared. Our shared variable detection routine is based on the premise that all shared variables are either global variables of threads, aliases thereof, pointers passed as parameters to application program interface (API) functions or escape variables. Furthermore, we are interested in identifying precisely the subset of variables from the above set that are written to in the given program as only these can participate in a data race. The main challenge here is that since global variables can be accessed via local pointers, we need to track aliasing assignments leading to such local pointers. An additional complication is that not all assignments to aliases of global variables result in meaningful updates to global variables. Indeed, in a sequence of pointer assignments $p_1=p, \ldots, q=p_k$, starting at a pointer p to a global structure S, we see that assignments in the above sequence merely pass aliasing information without updating the value of any (scalar) variable. If, however, the above sequence is followed by an assignment of the form $p \rightarrow f = exp$ to a field f of S, then it is a genuine update to f thus making it a variable of interest. We show that such update sequences can be detected via an efficient dataflow analysis. In fact, in most Linux drivers, data global to a thread is usually stored as global structures having a large number of fields, typically 50 to 100. Only a small fraction of which are actually used for storing shared data which the new methods were able to isolate with high precision, declaring all the fields of a global structure as shared would simply generate too many bogus warnings.

A second step in static race detection is to accurately determine locksets at program locations where shared variables are accessed. Since locks are usually accessed via pointers, this includes the computation of must-aliases of these lock pointers. The accuracy of warning generation is therefore directly dependent on the accuracy of the must-alias pointer analysis. Moreover, for the sake of accuracy, lock aliases should be computed context sensitively. This is because most must-aliases in C programming arise from parameter passing of pointer arguments in functions, which alias to different pointers in different contexts. The result is that a context sensitive alias analysis produces drastically less bogus warnings than a context insensitive one. However, a key drawback of a context sensitive analysis is scalability as the number of possible contexts in a large program can easily explode.

In recent years, considerable research has been devoted to ameliorating this problem by storing contexts symbolically using data structures like BDDs. Implementation of BDD-based context sensitive pointer analysis like BDDBDDB have been shown in the prior art to give good results for Java™ programs. However, C programs, which are less structured than Java™ programs, typically have too many pointer variables and complex aliasing relations between them which become hard to handle using BDDBDDB as the program size grows. This was borne out by our experiments with a downloaded version of BDDBDDB.

New systems and methods for scalable context sensitive pointer analysis may combine the following aspects. (1) Divide and Conquer: This leverages the fact that we can partition the set of all pointers in a program into disjoint classes such that each pointer can only alias to a pointer within its class.

While, in general, aliasing is not an equivalence relation, many widely used pointer analyses generate equivalence relations that are over-approximations of aliasing. Since we use this initial pointer analysis only for partitioning, scalability is more critical than accuracy, and this is precisely what Steensgaard's (See B. Steensgaard, "Points-to analysis in almost linear time", in *POPL*, 1996, incorporated herein by reference) analysis offers. There are two important consequences of this partitioning. First, since we are only interested in lock pointers, and since lock pointers can only alias to other lock pointers, we can ignore non-lock pointers. This drastically cuts down on the number of pointers we need to consider for our analysis. Secondly, since a given lock pointer can, in general, be aliased to a small subset of the total set of lock pointers, Steensgaard analysis provides us with a further decomposition of the set of lock pointers into yet smaller partitions. A second and more accurate context-sensitive alias analysis is then carried out on these final partitions and even though expensive in general, it becomes scalable on these small classes.

(2) Procedure Summarization: This exploits locality of reference, i.e., the fact that locks and shared variables are accessed in a small fraction of functions. Our new summarization based must alias analysis procedure therefore needs to compute summaries only for this small number of functions thereby making our approach applicable to large programs. We emphasize that procedure summarization is extremely important in making any static analyses scalable. Indeed, typical real-life code has a large number of small functions that can be called from many different contexts. A non-summarization based technique like BDDBDDB can easily be overwhelmed as the program size grows. Note that it is the synergy resulting by combining the two techniques that enables us to achieve scalability. Indeed, divide and conquer can permit us to exploit locality of reference making summarization viable.

Finally, one of the main weaknesses of using static race detection techniques is that a large number of (bogus) race warnings can often be generated. We show that tracking lock acquisition patterns, instead of locksets, results in a warning reduction technique that is more accurate than the existing lockset based warning reduction technique in two ways. First, by leveraging acquisition histories in addition to locksets we can filter out warnings generated by lockset based technique at the warning generation stage itself. Secondly, once the warnings are generated, we can use a dominator-based technique that leverages acquisition histories to give provably better warning reduction. Additionally, by using ranking, we can guarantee that our reduction technique is sound, i.e., will not drop real data races in favor of bogus ones.

A system and method for race warning generation for computer program verification includes determining shared variables by performing a dataflow analysis. Locksets for lock pointers are determined in a context-sensitive alias analysis that may combine a divide and conquer method with function summarization to provide lack acquisition patterns. Race warnings are generated based on the lock acquisitions patterns.

A system and method for race warning generation for computer program verification includes determining shared variables by performing a dataflow analysis and determining points-to sets for lock pointers in a context-sensitive alias analysis that may combine a divide and conquer method with function summarization. Locksets and acquisition histories are determined at locations where shared variables are accessed. Warnings are generated based on disjointness of locksets and consistency of acquisition histories. Race warnings are reduced using an ordering relation based on both lockset and lock acquisition patterns.

A method for race warning generation for computer program verification includes determining shared variables by performing a dataflow analysis by performing the dataflow analysis to determine only genuine variable updates by determining which variables are written to in the program; determining must-aliases of locksets for lock pointers at program locations where shared variables are accessed in a context-sensitive alias analysis that combines a divide and conquer method with function summarization to provide lock acquisition patterns; and generating race warnings based on the lock acquisition patterns.

A system and method for race warning generation for computer program verification includes determining shared variables and determining context-sensitive points-to sets for lock pointers by focusing on pointers that may affect aliases of lock pointers, and by leveraging function summarization. Locksets are determined at locations where shared variables are accessed using the points-to sets for lock pointers. Warnings are based on disjointness of locksets.

A system and method for race warning generation for computer program verification includes automatically determining shared variables, efficiently determining context-sensitive points-to sets for lock pointers by focusing our analysis only on those pointers that may affect aliases of lock pointers which are typically few, and by leveraging function summarization, determining locksets at locations where shared variables are accessed using the computed points-to sets for lock pointers, and generating warnings based on disjointness of locksets.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 depicts program code for implementing a dataflow analysis for shared variable detection in accordance with the present principles;

FIG. 3 depicts an example program on which computing procedure summaries in a context-sensitive pointer analysis is demonstrated in accordance with the present principles;

FIG. 4 depicts an illustrative program code for summary computation for lock pointer analysis in accordance with the present principles;

FIG. 5 depicts an illustrative program code for demonstrating warning reduction in accordance with the present principles.

DETAILED DESCRIPTION OF PREFERRED EMBODIMENTS

Figure 1:
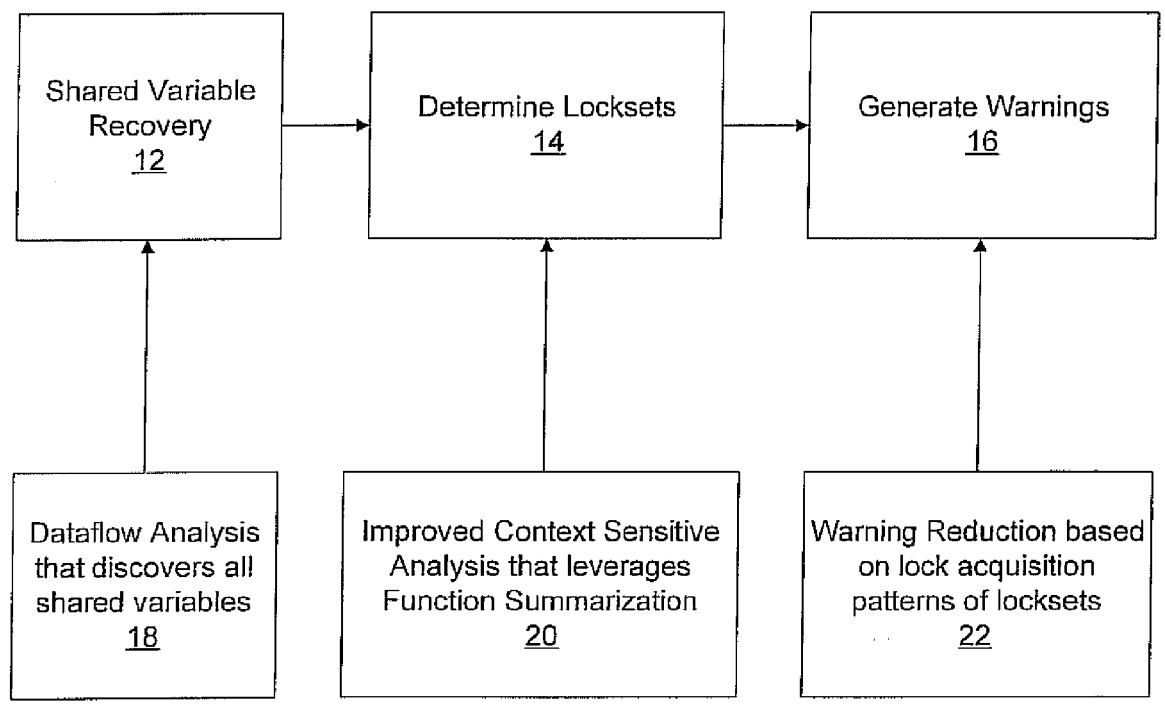
FIG. 1 is a block/flow diagram showing a system/method for detecting and generating data race warnings in accordance with one illustrative embodiment.

Present embodiments provide improved solutions for the data race problem in computer verifications systems. New systems and methods are provided for fast, accurate and scalable static race detection in concurrent programs. Focusing the analysis on Linux device drivers permits identification of the unique challenges posed by debugging large-scale real-life code and also pinpointed drawbacks in existing race warning generation methods. This motivated the development of new techniques that helped in improving both the scalability as well as the accuracy of each of the three main steps in a race warning generation system. The first step in data race detection is automatic shared variable discovery. Towards that end, a new, efficient dataflow method is described for shared variable detection which is more effective than existing correlation-based techniques that failed to detect shared variables responsible for data races in majority of the drivers in our bench-mark suite.

Secondly, accuracy of race warning generation strongly hinges on the accuracy of the pointer analysis used to compute aliases for lock pointers. A new scalable context sensitive alias analysis has been formulated that effectively combines a divide and conquer strategy with function summarization and is demonstrably more efficient than existing BDD-based techniques. Thirdly, a new warning reduction system/method is provided that leverages lock acquisition patterns to yield provably better warning reduction than existing lockset based methods.

To identify the practical challenges posed by the debugging of large-scale real-life code, one analysis focused on detecting data races in Linux device drivers. A careful study of bug reports and CVS logs revealed that the two main reasons for the presence of data races in drivers are incorrect locking and timing related issues. Since timing related data races are hard to analyze at the software level, we chose to focus only on locking related bugs.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a block/flow diagram for a system/method 10 for data race detection and warning is illustratively depicted. In block 12, shared variable discovery is implemented. So as not to miss any shared variable, a very liberal definition of when a variable is declared as such is used. Essentially, we are interested in all genuine modifications to global variables, aliases thereof, pointer passed as parameters to API functions and escape variables. A global variable of a thread that is directly written to is declared as shared. Such variables can be determined merely by scanning through each program statement of the given driver. However, a global variable may also be accessed via a local pointer. Such a pointer q could occur at the end of a chain of pointer assignments $p_1=p, p_2=p_1, \ldots, q=p_k$ starting at a pointer p to, say, a global structure S, which is either global or passed as a parameter to an API function. Then, any variable v modified via an access through p is also a variable of interest. However, simply declaring all pointers occurring in such sequence as shared could lead to a lot of bogus warnings. Indeed, in the above assignment sequence, the assignments are not genuine updates but merely serve to propagate the value of fields S. If, however, the above sequence is followed by an assignment of the form $p_{k+1} \to f=exp$, where exp is either a local variable or an expression other than simple propagation of a data value, it is a genuine update and should be declared a shared variable of interest.

A sequence of assignments to pointers $p_1=p, p_2=p_1, \ldots, q=p_k$ is called a complete update sequence from p to q if for each i, there do not exist any assignments to pointers $p_i$ after it is written and before it is read in the sequence. Thus, one goal is to detect complete update sequences from p to q that are followed by the modification of a scalar variable accessed via q, where p either points to a global variable or is passed as a parameter to an API function.

Such sequences are determined using a new interprocedural dataflow analysis in block 18. Essentially the analysis procedure 18, shown in FIG. 2, propagates the assignments in complete update sequences as discussed above until it hits a genuine update to a locally global variable which it declares as shared. The procedure 18 keeps track of the potentially shared variable as a set $P_{sh}$. Given a thread T, to start with $P_{sh}$ includes variables of T that are pointers to global variables or passed as parameters to API functions. A separate variable $V_{sh}$ keeps track of variables involving genuine updates which are therefore shared. Each assignment of the form v=w is a propagation if w∈$P_{sh}$. Thus, if v∉$P_{sh}$ it is added to $P_{sh}$ (see e.g., lines 4-6 in Dataflow Analysis for Shared Variable Detection in FIG. 2). A variable v∈ $P_{sh}$ is included in $V_{sh}$ only if there is an assignment of the form v=exp, where exp is a genuine update as discussed above (lines 7-12).

Referring again to FIG. 1, locksets are determined at control locations where shared variables are accessed in block 14. Once the shared variables have been identified, a bottleneck in generating accurate lockset based warnings is a scalable context-sensitive must alias analysis in block 20 to determine locksets at control locations where shared variables are accessed. A new method for scalable context sensitive alias analysis is based on effectively combining a divide and conquer strategy with function summarization to leverage benefits of both techniques.

Partitioning: We can exploit the fact that, even though aliasing is not, in general, an equivalence relation, many alias analyses like Steensgaard's (referred to above) compute relations that are over-approximations of aliasing but are, importantly, equivalence relations. Additionally, an equally important feature of Steensgaard's analysis is that it is highly scalable. This makes it ideally suitable for the present purpose which is to partition the set of all the pointers in the program into disjoint classes that respect the aliasing relation, i.e., a pointer can only be aliased to pointers within the class to which it belongs. A drawback of Steensgaard's analysis is lack of precision. However, this can be achieved by then focusing a more refined analysis on each individual Steensgaard partition.

Indeed partitioning, in effect, decomposes the pointer analysis problem into much smaller sub-problems where instead of carrying out the pointer analysis for all the pointers in the program, it suffices to carry out separate pointer analyses for each equivalence class. The fact that the partitioning respects the aliasing relation guarantees that we will not miss any aliases. The small size of each partition then offsets the higher computational complexity of a more precise analysis. As noted, the Steensgaard generated equivalence class for a lock pointer includes only a small subset of lock pointers of the given program thus ensuring scalability of a context-sensitive alias analysis on each such partition, A divide and conquer method may be employed for partitioning.

Another aspect of block 20 includes exploiting locality of references via summarization. Using decomposition, once the set of pointers under consideration have been restricted to small sets of lock pointers, we can further exploit locality of reference which then permits effectively leveraging procedure summarization for scalable context sensitive pointer analysis.

In real-life programs, shared variables, and as a consequence locks, are accessed in a very small number of functions. Instead of following the BDDBDDB approach that pre-computes aliases for all pointers in all contexts, it is much more scalable to instead use procedure summarization to capture all possible effects of executing a procedure on lock pointers. The reason it is more scalable is that we need to compute these summaries only for the small fraction of functions in which lock pointers are accessed.

Once we have pre-computed the summaries, the aliases for a lock pointer at a program location in a given context can be generated efficiently on demand, We emphasize that it is this decomposition that permits leveraging locality of reference. Without decomposition, we would have to compute summaries for each function with a pointer access, i.e., practically every function in the given program. Additionally, for each function we would need to compute the summary for all pointers modified in the function, not merely the lock pointers, which could greatly increase the termination time of the method. Divide and conquer may optionally be combined with summarization in block 20 to exploit the synergy between the two techniques.

Computing procedure summaries for context-sensitive pointer analyses may include the following. A new summarization based technique for demand driven context sensitive pointer analysis is provided. Given a context, i.e., a sequence of function calls, con=$f_1$ ..., $f_n$, pointers p and p' are aliased in con if there is a complete update sequence $p_1$=p', $p_2$=$p_1$, ..., p=$p_m$ during the execution of the functions in con.

To compute the must-alias set of a pointer p at control location l of function $f_n$ in context con, we first compute the set $A_n$, of pointers such that for each q∈$A_n$, there is a complete update sequence from q to p along each path starting at the entry location of function $f_n$ to control location l. Having obtained $A_n$, we start traversing backwards along the sequence of functions in con. This involves computing for each pointer q∈$A_n$, the set $A^q_{n-1}$, of all pointers r such that there is a complete assignment sequence from r to q along each path starting from the entry location of $f_{n-1}$ to the location where $f_n$ was called. Set $A_{n-1}=\cup_{q\in An} A^q_{n-1}$. Then, repeating the above procedure for each function in con until we reach the root function $f_1$ gives us the must-aliases of p. This is to compute summaries that capture the effect of each function on lock pointers.

The summary for a function f in a given program is the set of all tuples of the form (p, l, A), where p is a pointer written to at location l in f and A is set of all pointers q such that there is a complete update sequence from q to p along each path starting at the entry location off and ending at l. The set A is denoted by Sum(f,p,l).

Referring to FIG. 3, as an example, a program 100 includes global pointers p and q. First, since no pointer is modified in "bar", its summary is empty. Also, $g_3$∈Sum (goo, 2c, p) and $g_4$∈Sum (goo, 2c, q). Similarly, $g_4$∈Sum(goo, 5c, q) but $g_5$∉Sum (goo, 5c, p). This is because the control flow branches at location 3c with p being set to $g_5$ in one branch and retaining the old value $g_3$ in the other. Statically, there is no way of deciding whether $g_3$ and $g_5$ are the same pointer. Thus, Sum(goo, 5c, p)=0. Sum(foo, 2a, p)={$g_1$} and Sum (foo, 2a, q)={$g_2$}, whereas Sum (foo, 3a, p)=0 and Sum (foo, 3a, q)={$g_4$}.

Note that we do not need to cache the summary tuples for each program location of a function. For function $f_i$, where 1≤i≤n−1, all we need are the summary tuples for the locations where $f_{i+1}$ is called. In addition, we also need to cache the summary tuple for the exit location as it may be needed while performing the dataflow analysis. For the last function $f_n$ in con, we need the summary tuples for each location in the function where a lock pointer is accessed. Since the number of such locations is few, the sizes of the resulting summaries are small.

Referring to FIG. 4, a method for summary computation for lock pointer analysis is illustratively shown. Given a pointer p and location l in function f, we perform a backward traversal on the control flow graph (CFG) of the given program starting at l, and track the complete update sequences as tuples of the form (m, A), where m is a program location and A is a set of lock pointers q such that there is a complete update sequence from q to p starting from m and ending at l. The method of FIG. 4 maintains a set W of tuples that are yet to be processed and a set P of tuples already processed. Initially, W includes the tuple (l, {p}) (in line 2 of FIG. 4). Note that before processing a tuple (m, A) from W, since one goal is to compute must-aliases, we need to make sure that each successor m' of m from which there exists a path in the CFG leading to l has already been processed during the backward traversal, i.e., W currently has no tuples of the form (m', D). Such a tuple is called ready (line 4 of FIG. 4). If the statement at m is of the form r=t, where t∈A, then in processing (m, A), let A' be the set that we get from A by replacing t with r else A'=A (lines 5-7 of FIG. 4).

To propagate the pointers in A' backwards, there are two cases to consider. First, assume that m is a return site of a function g that was called from within f. Then, we have to propagate the effect of executing g backwards on each pointer in A'. We first check whether the summary tuples for g have already been computed for each of the pointers in A' for the exit location $exit_g$ of g. If they have, then we form the new tuple (m', B), where m' is the call site of g corresponding to the return site m and B=$\cup_{r \in A'}$ Sum(g, $exit_g$, r) (t is substituted for r in lines 12-15 in FIG. 4). If, on the other hand, the summary tuples have not been computed, we introduce a new tuple ($exit_g$, A') in the worklist (line 16 of FIG. 4). For the second case, we assume that, m is not a function call return site, we consider the set Pred of all the predecessor locations of m in f (line 19 of FIG. 4). For each m'∈Pred, we form the tuple (m', A'). If tuple (m', A') has already been processed no action is needed. Else, if there already exists a tuple of the form (m', C) in W, then we have discovered a new backward path to location m' (1 is m' substituted for m' in FIG. 4). Since we are computing must aliases, i.e., intersection of aliases discovered along all backwards CFG paths, we replace the tuple (m', C) with the tuple (m', A'∩C) ((m', C∩B) in line 23 of FIG. 4). If there exists no such tuple, then we simply add the new tuple (m', A') (or (l, B) in FIG. 4) to W (line 25 in FIG. 4).

Referring again to FIG. 1, in block 16, warnings are generated with leveraging of acquisition histories for warning reduction. In block 22, two new race warning reduction techniques are provided and employed that are based on tracking lock acquisition patterns and are provably more accurate than the existing lockset-based warning reduction techniques (see e.g., J. Choi, K. Lee, A. Loginov, R. O'Callahan, V. Sarkar, and M. Sridharan, in "Efficient and precise data race detection for multithreaded object-oriented programs", in *PLDI*, 2002, incorporated herein by reference and hereinafter referred to as Choi).

The new reduction technique proceeds in two stages. In the first stage, we make use of the notion of consistency of lock acquisition histories which governs whether program locations in two different threads are simultaneously reachable. This permits us to discard, in a sound fashion, those warnings wherein lock acquisition histories are inconsistent even though disjoint locks are held at the corresponding program locations. Lockset based techniques could not remove such warnings. In the second stage, we use yet another warning reduction technique complementary to the first one, which is based on defining an acquisition history based weaker than relation on the remaining warnings that is more refined than the lockset based weaker than relation defined in Choi.

The present strategy improves upon Choi in at least two ways (i) by leveraging inconsistency of acquisition histories to remove warnings in a sound fashion, and (ii) by providing a provably more refined weaker than relation. The lockset based weaker than relation technique of Choi defines an access event as a 4-tuple of the form (v, T, L, a, c), where v is a shared variable accessed at control location c of thread T with lockset L and a denotes the type of accesses, i.e., whether it is a read or a write. Let $e_1$, $e_2$ and $e_3$ be access events such that $e_2$ and $e_3$ occur along a same local computation path of a thread. Then, if the occurrence of a race between $e_1$ and $e_2$ implies the occurrence of a race between $e_1$ and $e_3$, we need not generate a warning for the pair ($e_1$, $e_2$). In this case, the event $e_3$ is said to be weaker than $e_2$, denoted by $e_3 \sqsubseteq e_2$. The relation $\sqsubseteq$ is hard to determine precisely without exploring the state space of the program, which is inefficient. Instead, it is over-approximated via static analysis. A lockset based approximation, $\sqsubseteq_l$, given in Choi is defined as a "lockset based weaker than" (Choi). For access event p=(v, T, $L_1$, $c_1$) occurring before access event q=(v, T, L2, $a_2$, $c_2$) along a common local computation x of thread T, p $\sqsubseteq_l$ q iff $L_1 \subseteq L_2$ and either $a_1=a_2$ or $a_1$ is a write operation.

Referring to FIG. 5, in acquisition history based warning reduction, we motivate the technique with the help of a simple concurrent program CP comprised of the two threads $T_1$ and $T_2$ as shown in FIG. 5 that access a shared variable x. Let $e_1$, $e_2$, $e_3$ and $e_4$ denote accesses to x at locations 6a, 6b, 9b and 2b, respectively in FIG. 5. Note that the locksets at control locations 6b and 9b are $L_2$={lk2} and L3={lk2}, respectively. Since $L_2 \subseteq L_3$, $e_2 \sqsubseteq_l e_3$ and so the lockset based reduction technique would drop ($e_1$, $e_3$) in favor of ($e_1$, $e_2$).

However, control locations 6a and 6b are not simultaneously reachable whereas 6a and 9b are, even though disjoint locksets are held at the two locations in either case. The reason is that simultaneous reachability of two control locations in separate threads depends not merely on the locks held at these locations but also on the patterns in which they were acquired in the individual threads. For $T_2$ to reach 6b, it needs to execute the statements at locations 3b and 5b, i.e., acquire and release lock lk1. Note, however, that once $T_1$ acquires lk1 at location 2a, it does not release it until after it has exited 6a. Thus, for the two threads to simultaneously reach 6a and 6b, $T_2$ needs to first acquire and release lk1, i.e., should already have executed 5b before $T_1$ executes 2a. However, in that case $T_2$ holds lock lk2 (via execution of lb) which it cannot release, thus preventing $T_2$ from executing 3a and transiting further. The simultaneous reachability of 6a and 9b, on the other hand, is easy to check. Thus, the $\sqsubseteq_l$-based reduction of Choi drops a warning corresponding to a real data race in favor of a bogus one. In general, when testing for reachability of control states c and c' of two different threads, we need to test whether there exist paths x and y in the individual threads leading to states c and c' holding lock sets L and L' which can be acquired in a compatible fashion so as to prevent the dropping scenario above. Compatibility can be captured using the notion of acquisition histories.

Acquisition history: Let s be a global computation of a concurrent program CP leading to global configuration c. Then for thread $T_i$ and lock l of CP such that l∈Lock-Set($T_i$, c), we define AH($T_i$, l, x) to be the set of locks that were acquired (and possibly released) by $T_i$ after the last acquisition of l by $T_i$ along x. If L is the set of locks, each acquisition history AH is a map L→$2^L$ associating with each lock a lockset (the acquisition history of that lock). We say that $AH_1$ and $AH_2$ are consistent if there do not exist locks $l_1$ and $l_2$, $l_1 \in AH_2(l_2)$ and $l_2 \in AH_1(l_1)$. Then the above discussion can formalized as follows.

Decomposition Result: Let CP be a concurrent program comprised of the two threads $T_1$ and $T_2$. Then, for control states $a_1$ and $b_2$ of $T_i$ and T2, respectively, $a_1$ and $b_2$ are simultaneously reachable only if there are local computations x and y of threads $T_1$ and $T_2$ leading to control states $a_1$ and $b_2$, respectively, such that (i) locksets at $T_1$ and T2 at $a_1$ and $b_2$, respectively, are disjoint, and (ii) the acquisition histories $AH_1$ and $AH_2$ at $a_1$ and $b_2$, respectively, are consistent. If the threads communicate solely via nested locks then the above conditions are also sufficient. These acquisition histories can be tracked via static analysis much like locksets. To leverage the decomposition result, we therefore define an ah-augmented access event as a tuple of the form (v, T, L, AH, a, c), where (v, T, L, a, c) is an access event and AH is the current acquisition history. The warning reduction in block 22 proceeds in two stages.

Stage I. Since consistency of acquisition histories is a necessary condition for simultaneous reachability, we drop all warnings $(e_1, e_2)$, where $e_i = (v, T, L_i, AH_i, a_i)$ and $AH_1$ and $AH_2$ are inconsistent. In our example, $(e_1, e_3)$ will be dropped at this stage.

Stage II. On the remaining warnings, we impose a new acquisition history based weaker than relation $\sqsubseteq_a$. Given two acquisition histories, $AH_1$ and $AH_2$, we say that $AH_1 \sqsubseteq AH_2$ if for each lock l, $AH_1(l) \subseteq AH_2(l)$. An immediate but important consequence is the following: Given acquisition history tuples AH, $AH_1$ and $AH_2$, such that $AH_1 \sqsubseteq AH_2$, AH is consistent with $AH_2$ implies that AH is consistent with $AH_1$.

Acquisition History based Weaker Than: For access event $e_1 = (v, T, L_1, AH_1, a_1, c_1)$ occurring before $e_2 = (v, T, L_2, AH_2, a_2, c_2)$ along a common computation of thread T, $e_1 \sqsubseteq_a e2$ if $L_1 \subseteq L_2$, $AH_1 \sqsubseteq AH_2$ and either $a_1 = a_2$ or $a_1$ is a write operation.

In our example, the acquisition histories for events $e_1$, $e_3$ and $e_4$ are $AH_1 = \{(lk1, \{lk2\})\}_1$, $AH_3 = \{(lk2, (0)\}$ and $AH_4 = \{(lk2, (0)\}$, respectively. Clearly, $AH_4 \sqsubseteq AH_3$, and so $e_4 \sqsubseteq_a e_3$. Thus we drop $(e_1, e_3)$ and retain $(e_1, e_4)$. The intuition behind this is that any local computation of $T_2$ leading to accesses $e_3$ has to pass through the access $e_4$. Moreover, since $AH_3 \sqsubseteq AH_4$, it follows that if $AH_1$ and $AH_3$ are consistent then so are $AH_1$ and $AH_4$. Thus, since $T_1$ and $T_2$ communicate only via nested locks, by the decomposition result, if there is a computation realizing the data race corresponding to the warning $(e_1, e_3)$, then there also exists one realizing $(e_1, e_4)$. Thus, we may drop $(e_1, e_3)$ in favor of $(e_1, e_4)$.

Acquisition History-based Covers: Note that in general there might be multiple paths leading to an access event $e_k$, in which case before dropping a pair $(e_i, e_k)$, we need to make sure that along each path in the program leading to $e_k$ there exists an access event $e_j \sqsubseteq_a e_k$. This can be accomplished by using the notion of a cover for an access event. Given an access event e, a Cover for e is a set of access events c such that $c \sqsubseteq_a e$. Such a cover can be easily determined via a backwards dataflow analysis from the program location corresponding to e.

Making Reduction Sound via Ranking: We note that if the thread synchronization is not merely lock based, a reduction strategy based on either $\sqsubseteq_a$ or $\sqsubseteq_l$ is not sound. In Choi, a manual inspection routine is proposed in order to identify real warnings that may have been dropped which may not be practical. We propose using ranking to ensure soundness. We do not drop any warning based on $\sqsubseteq_a$ but merely rank the warnings. Then, whether a warning lower in the order is inspected is contingent on the fact that the warning higher in the order turns out to be a bogus one.

Figure 6:
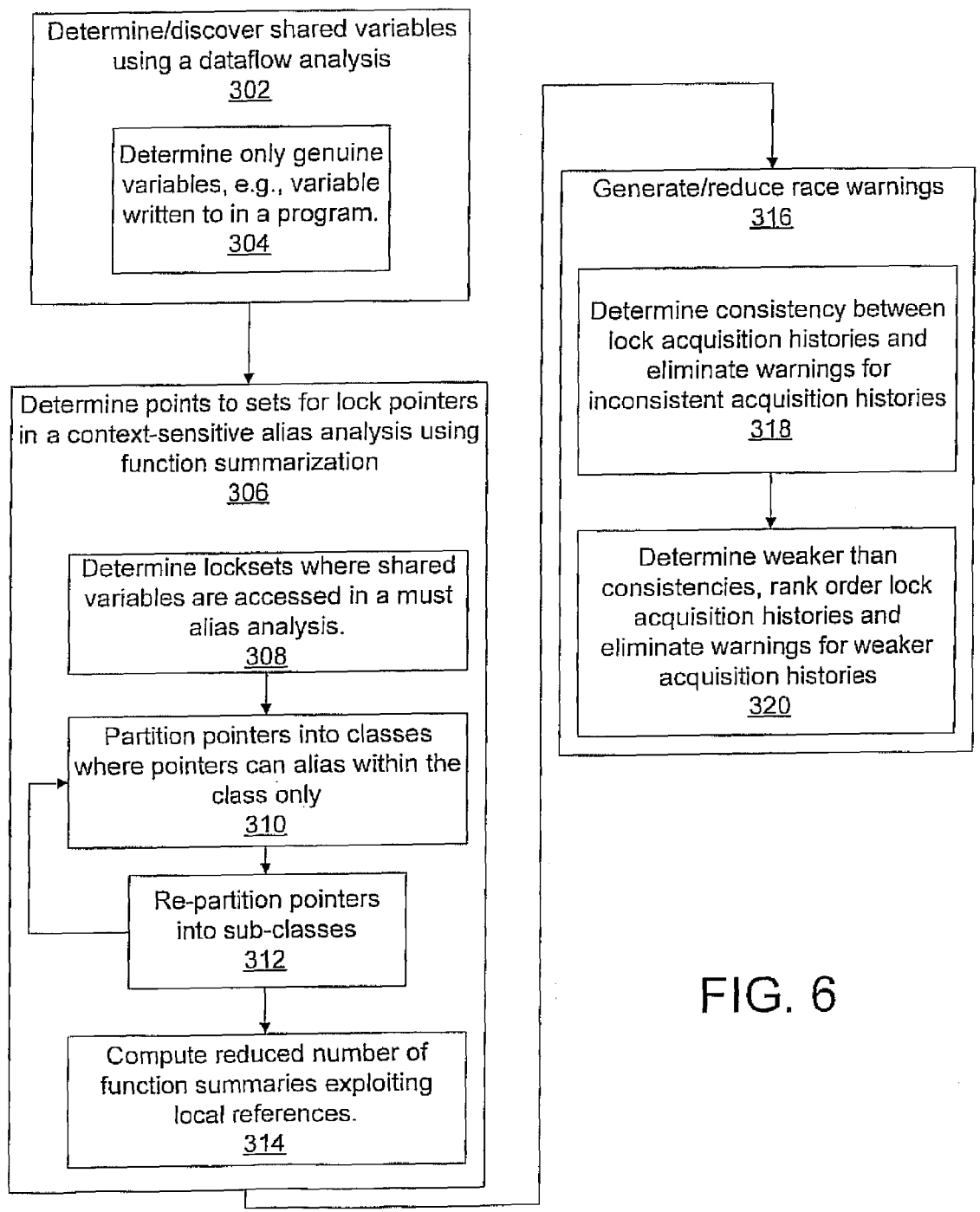
FIG. 6 is a block/flow diagram showing a system/method for detecting, generating and reducing data race warnings in accordance with another illustrative embodiment.

Referring to FIG. 6, a system/method for determination, generation and reduction of race warnings for computer program verification is illustratively shown. In block 302, a determination of shared variables is performed using a dataflow analysis. In block 304, the dataflow analysis is employed to determine only genuine variable updates by determining which variables are written to in the program. This limits the variable space.

In block 306, points-to sets for lock pointers are determined in a context-sensitive alias analysis that employs function summarization. In block 308, the locksets and acquisition histories are preferably determined at program locations where shared variables are accessed in a must-alias analysis of lock pointers.

In block 310, partitioning a set of all pointers in the program into disjoint classes may be performed such that each pointer can only alias to a pointer in a same class. This may optionally include re-partitioning the set of all pointers in the program into sub-classes such that each pointer can only alias to a pointer in a same sub-class in block 312.

In block 314, function summaries are computed for a reduced number of functions in a must alias analysis by employing local references to shared variables and locks to reduce the number of functions. The local references may be enhanced by the divide and conquer strategy and exploited to reduce the number of function summaries analyzed.

In block 316, race warnings are generated/reduced based on the lock acquisitions patterns. The race warnings include reductions in the number of warnings as well. The warnings are generated based on disjointness of locksets and consistency of acquisition histories. The race warnings are reduced preferably using an ordering relation based on the both locksets and lock acquisition patterns. In block 318, consistency is determined between lock acquisition histories for simultaneous reachability of a program location between two threads. In this way, warnings associated with inconsistent lock acquisition histories can be disregarded to reduce the number of warnings. In block 320, "weaker than" consistencies are determined to rank lock acquisition histories to eliminate warnings associated with the weaker lock acquisition histories.

This system/method provides improved/reduced data race warnings in a computer verification system/method. Experimental results are provided hereinafter.

Experimental Results: The experimental results for our suite of 10 Linux device drivers downloaded from kernel.org are tabulated below in Table 1. The results clearly demonstrate (i) the effectiveness of our shared variable discovery routine, (ii) the scalability and efficiency (Time column) of our new summary based pointer analysis, and (iii) the effectiveness and hence the importance of leveraging warning reduction techniques. The BDDBDDB and Time columns refer to the times taken (not including the time taken for building the CFG—typically less than a minute) when using, respectively, the BDDBDDB engine or our new summary based technique for must-alias analysis. The improvement in efficiency is clearly evident. The BDDBDDB engine was run only on the first three drivers. The columns labeled War and Aft. Red refer, respectively, to the total number of warnings generated originally and after applying reduction based on the $\sqsubseteq_a$ relation. Even after applying these reductions, there could still be a lot of warnings generated as Linux drivers usually have a large number of small functions resulting in a large number of contexts. Thus, the same program location may generate many warnings that result from essentially the same data race but different contexts. The column Aft. Con. refers to the number of warnings left after generating only one warning for each program location and abstracting out the contexts.

TABLE 1

| Driver | KLOC | #ShVars | #War | #Aft.Red. | #Aft.Con. | BDDBDDB | Time(secs) |
|---|---|---|---|---|---|---|---|
| hugetlb | 1.2 | 5 | 4 | 1 | 1 | 15 min | 3.2 |
| ipoib_multicast | 26.1 | 10 | 33228 | 6 | 6 | >1 hr | 7 |

TABLE 1-continued

| Driver | KLOC | #ShVars | #War | #Aft.Red. | #Aft.Con. | BDDBDDB | Time(secs) |
|---|---|---|---|---|---|---|---|
| plip_test | 13.7 | 17 | 94 | 51 | 51 | >30 min | 5 |
| sock | 0.9 | 6 | 32 | 21 | 13 | — | 2 |
| ctrace_comb | 1.4 | 19 | 985 | 218 | 58 | — | 6.7 |
| autofs_expire | 8.3 | 7 | 20 | 8 | 3 | — | 6 |
| ptrace | 15.4 | 3 | 9 | 1 | 1 | — | 15 |
| tty_io | 17.8 | 1 | 6 | 3 | 3 | — | 4 |
| raid | 17.2 | 6 | 23 | 21 | 13 | — | 1.5 |
| pci_gart | 0.6 | 1 | 3 | 1 | 1 | — | 1 |

Data race detection being a problem of fundamental interest has been the subject of extensive research. Many techniques have been leveraged in order to attack the problem including dynamic run-time detection, static analysis and model checking. One such approach is Choi which leverages the use of static analysis to reduce the number of data race warnings that need to be validated via a run-time analysis. The advantage of run-time techniques is the absence of false warnings. On the other hand, the disadvantages are the extra cost incurred in instrumenting the code and poor coverage both of which become worse as the size of code increases especially in the context of concurrent programs. Additionally, run time detection techniques presume that the given code can be executed which may not be an option for applications like device drivers.

Model Checking, which is an efficient exploration of the state space of the given program, is another powerful technique that has been employed in the verification of concurrent programs. However, the state space explosion has made it hard to verify concurrent programs beyond 10,000 lines of code and is thus not, with the current state-of-the-art, an option for debugging large-scale real-life code.

Recently, there has been a spurt of activity in applying static analysis techniques for data race detection. An advantage of such techniques is that they can be made to scale to large programs. The key disadvantage is that since static analysis works on heavily abstracted versions of the original program, they are not refined enough and can produce a large number of false warnings.

The approach in accordance with the present principles strengthens static analysis to make it more refined with the goal of reducing the number of bogus warnings. The steps to an accurate race detection procedure include (i) accurate shared variable discovery, (ii) scalable context sensitive pointer analysis to determine must locksets, and (iii) effective warning reduction. A new shared variable detection analysis has been described that can be used to enhance existing correlation based techniques. We have provided a new scalable context sensitive must alias analysis which ensures both scalability and accuracy of a race detection analysis.

Prior context-sensitive alias analysis techniques have been shown to be more successful for Java than C, whereas other techniques simply do not use any pointer analysis at all, which limits their accuracy.

In accordance with the present principles, a new two stage acquisition history based warning reduction technique has been employed which is provably more accurate than the existing lockset based analysis given in Choi. Experimental results on a suite of Linux drivers demonstrate the efficacy, i.e., both the accuracy and scalability, of the present principles.

Having described preferred embodiments of systems and methods for fast and accurate static data-race detection for concurrent programs (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for race warning generation for computer program verification, comprising:
    determining shared variables;
    determining context-sensitive points-to sets for lock pointers by focusing on pointers that affect aliases of lock pointers, and by leveraging function summarization;
    determining locksets at locations where shared variables are accessed using the points-to sets for lock pointers; and generating warnings based on disjointness of locksets.

2. The method as recited in claim 1, wherein determining shared variables includes performing a dataflow analysis.

3. The method as recited in claim 2, wherein the dataflow analysis tracks maximal update sequences to identify only genuine variable updates.

4. The method as recited in claim 1, wherein determining context-sensitive points-to sets for lock pointers includes partitioning a set of all pointers in the program into disjoint classes such that each lock pointer can only alias to a pointer in the same class.

5. The method as recited in claim 4, further comprising re-partitioning the set of all pointers in the program into sub-classes such that each lock pointer can only alias to a pointer in the same sub-class.

6. The method as recited in claim 1, wherein determining context-sensitive points-to sets for lock pointers includes computing function summaries for a reduced number of functions that have lock accesses.

7. The method as recited in claim 1, further comprising computing acquisition histories at locations where shared variables are accessed using the points-to sets for lock pointers.

8. The method as recited in claim 1, wherein generating warnings includes generating warnings for pairs of locations in different threads accessing a same shared variable including checking that the lock acquisition histories are consistent.

9. The method as recited in claim 1, wherein generating warnings is followed by reducing race warnings.

10. The method as recited in claim 9, where reducing race warnings includes determining consistency between lock acquisition histories for simultaneous reachability of a program location between two threads and disregarding warnings associated with inconsistent lock acquisition histories.

11. The method as recited in claim 9, further comprising determining weaker than ordering relations based on locksets and acquisition histories to rand warnings and then eliminating warnings lower in the order.

12. A non-transitory computer readable medium for race warning generation for computer program verification comprising a computer readable program, wherein the computer readable program when executed on a computer causes the computer to perform the steps of:
   determining shared variables;
   determining context-sensitive points-to sets for lock pointers by focusing on pointers that affect aliases of lock pointers, and by leveraging function summarization;
   determining locksets at locations where shared variables are accessed using the points-to sets for lock pointers; and
   generating warnings based on disjointness of locksets.

13. The computer readable medium as recited in claim 12, wherein determining shared variables includes performing a dataflow analysis that tracks maximal update sequences to identify only genuine variable updates.

14. The computer readable medium as recited in claim 12, wherein determining context-sensitive points-to sets for lock pointers includes partitioning a set of all pointers in the program into disjoint classes such that each lock pointer can only alias to a pointer in the same class.

15. The computer readable medium as recited in claim 14, further comprising re-partitioning the set of all pointers in the program into sub-classes such that each lock pointer can only alias to a pointer in a same sub-class.

16. The computer readable medium as recited in claim 12, wherein determining context-sensitive points-to sets for lock pointers includes computing function summaries for a reduced number of functions that have lock accesses.

17. The computer readable medium as recited in claim 12, further comprising computing acquisition histories at locations where shared variables are accessed using the points-to sets for lock pointers.

18. The computer readable medium as recited in claim 12, wherein generating warnings includes generating warnings for pairs of locations in different threads accessing a same shared variable including checking that the lock acquisition histories are consistent.

19. The computer readable medium as recited in claim 12, wherein generating warnings is followed by reducing race warnings.

20. The computer readable medium as recited in claim 19, wherein reducing race warnings includes determining consistency between lock acquisition histories for simultaneous reachability of a program location between two threads and disregarding warnings associated with inconsistent lock acquisition histories.

21. The computer readable medium as recited in claim 20, further comprising determining weaker than ordering relations based on locksets and acquisition histories to rank warnings and then eliminating warnings lower in the order.

22. A method for race warning generation for computer program verification, comprising:
   automatically determining shared variables by performing a dataflow analysis by performing the dataflow analysis to determine only genuine variable updates by determining which variables are written to in the program;
   determining context-sensitive points-to sets for lock pointers efficiently by focusing on pointers that affect aliases of lock pointers, and by leveraging function summarization;
   determining locksets at locations where shared variables are accessed; and
   generating race warnings based on the locksets and lock acquisition patterns.

23. The method as recited in claim 22, wherein determining locksets includes:
   partitioning a set of all pointers in the program into disjoint classes such that each pointer can only alias to a pointer in a same class; and
   computing function summaries for a reduced number of functions in a must alias analysis by employing local references to shared variables and locks to reduce the number of functions.

24. The method as recited in claim 22, wherein partitioning includes re-partitioning the set of all pointers in the program into sub-classes such that each pointer can only alias to a pointer in a same sub-class.

25. The method as recited in claim 22, wherein generating race warnings based on the lock acquisition patterns includes:
   determining consistency between lock acquisition histories for simultaneous reachability of a program location between two threads and disregarding warnings associated with inconsistent lock acquisition histories; and
   determining weaker than consistencies to rank lock acquisition histories to eliminate warnings associated with weaker lock acquisition histories.

* * * * *